Dec. 20, 1966  J. A. GIARO  3,293,351
ELECTRIC POWER CABLE
Filed Feb. 3, 1964  2 Sheets-Sheet 1

Inventor
Joseph A. Giaro
By
Watson, Cole, Grindle & Watson
Attorneys

Dec. 20, 1966  J. A. GIARO  3,293,351
ELECTRIC POWER CABLE
Filed Feb. 3, 1964  2 Sheets-Sheet 2
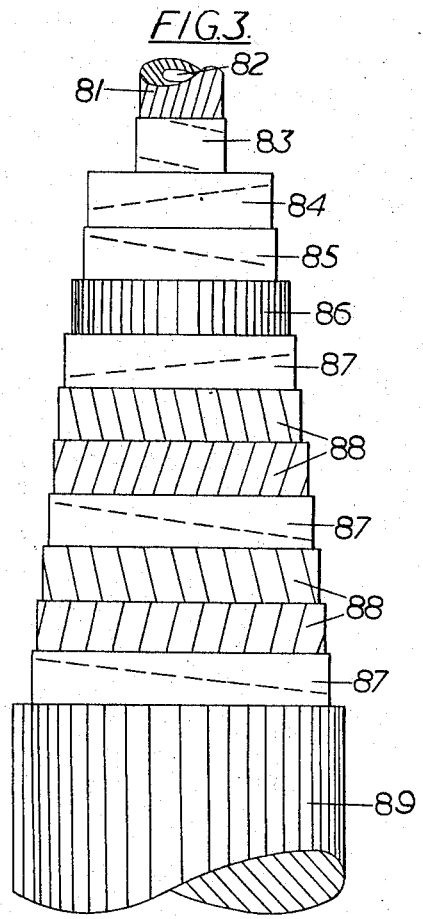
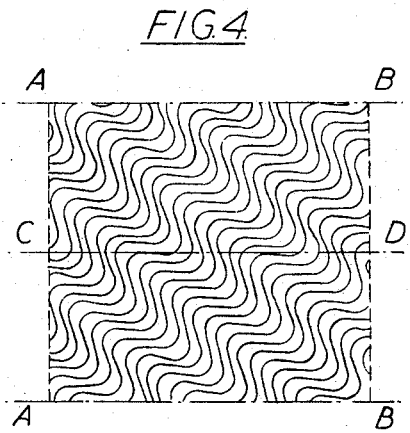
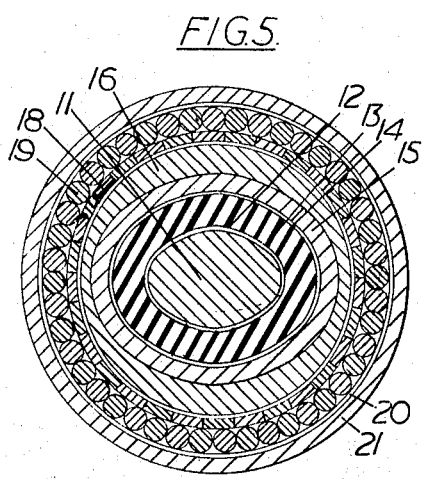
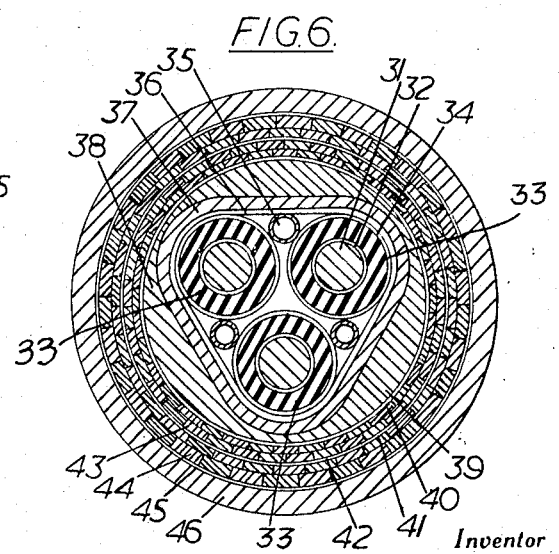
Inventor
Joseph A. Giaro
By
Watson, Cole, Grindle & Watson
Attorneys

United States Patent Office 3,293,351
Patented Dec. 20, 1966

3,293,351
ELECTRIC POWER CABLE
Joseph Antoine Giaro, 17 Rue du Bois d'Airemont,
Mont-sur-Marchienne, Belgium
Filed Feb. 3, 1964, Ser. No. 342,127
Claims priority, application Belgium, Feb. 5, 1963,
627,999; Nov. 8, 1963, 640,009
2 Claims. (Cl. 174—25)

This invention relates to electric power cables consisting of one or more conductors insulated with a dielectric which comprises a fluid, for example, paper impregnated with cable compound, an impermeable sheath and an external armouring.

In order to increase the voltage rating of an electric power cable it is known to place the dielectric under a preliminary pressure. When current passes through the cable the cable core expands and when the current ceases the cable cools. It is important to prevent the formation within the cable core of vacuum spaces or spaces filled with air or vapour disengaged from the fluid of the dielectric. If the dielectric is placed under preliminary pressure it is usual to provide reservoirs of fluid which will maintain an increased pressure during the heating due to passage of current and thus will prevent the formation of such spaces.

It is the object of the present invention to provide an elastic amouring which will expand during heating of the cable and contract again to maintain the required pressure in the cable.

It has been proposed in U.S. Patent No. 2,240,745 to R. W. Atkinson to provide an elastic covering to the impervious sheath of an electric power cable which covering was composed of a material, such as vulcanised rubber having an elastic extension greater than the thermal expansion of the cable. This covering of vulcanised rubber could be reinforced by means of metal wires laid helicoidally. The vulcanised rubber alone, however, was intended to take up the energy of thermal expansion of the cable insulation and to liberate such energy to compress the cable core when the cable cools down.

A further object of the present invention is to provide an elastic armouring consisting of a material, such as steel, which is capable of exerting a very high pressure on the cable core thus avoiding the well known inconveniences in the use of vulcanised rubber and like materials.

The greatest difficulty in making an elastic armouring of high mechanically resistant material with high resilience, such as steel, consists in this, that the relative thermal expansion of a cable core insulated with impregnated paper is between 2.5% and 3.0% while the elastic limit of metals in general and steel in particular does not exceed 0.2%. This difficulty may, however, be overcome by means of a helical winding of wire or tape, if the pitch of the winding be properly chosen.

The pitch angle $\alpha$ is chosen according to the formula:

$$\sin \alpha = \sqrt{2 \frac{\Delta l/l}{\Delta v_i/v_i} f_i}$$

in which $\Delta v_i/v_i$ is the relative increase in the volume of the cable core in relation to the initial volume $v_i$ within the impervious sheath; $\Delta l/l$ is the unitary elastic elongation admissible for the elements of the armouring, and $f_1$ is a correction coefficient due to the fact that the external diameter of the expansible core of the cable does not necessarily coincide with the internal diameter of the armouring. This coefficient $f_1$ can be calculated as a function of the mechanical and thermal properties of the materials of the intermediate layers between the cable core and the elastic armouring. As a first approximation $f_1$ can be taken as $(d_a)^2/d_i$ (in which $d_a$ is the internal diameter of the elastic armouring and $d_i$ the external diameter of the cable core) in the case in which the material of the intermediate layers is deformed but keeps a substantially constant volume. If, however, the deformation of the intermediate layers is produced whilst the material keeps a constant thickness, $f_1$ can be taken $= d_a/d_i$.

If, however, the above formula be applied directly, the dimensions of the elastic armouring would in many cases become excessive.

It is, therefore, a still further object of the present invention to provide an elastic armouring of metal laid helically over the cable which can be practically realised in conventional materials for even the highest internal pressures used and can operate to exercise the necessary pressure over the greatest variation occurring in practice.

The invention will be better understood from the following description taken in conjunction with the accompanying drawings in which FIG. 1 shows curves which illustrate a method of calculating the dimensions of an elastic armouring according to the invention.

FIG. 3 is a view with parts broken away, of the construction of a cable with multi-layer armouring.

FIG. 4 is a developed view of part of one form of armouring according to the present invention.

FIGS. 5 and 6 are cross-sections of different forms of cable each provided with armouring according to the present invention.

Figure 1:
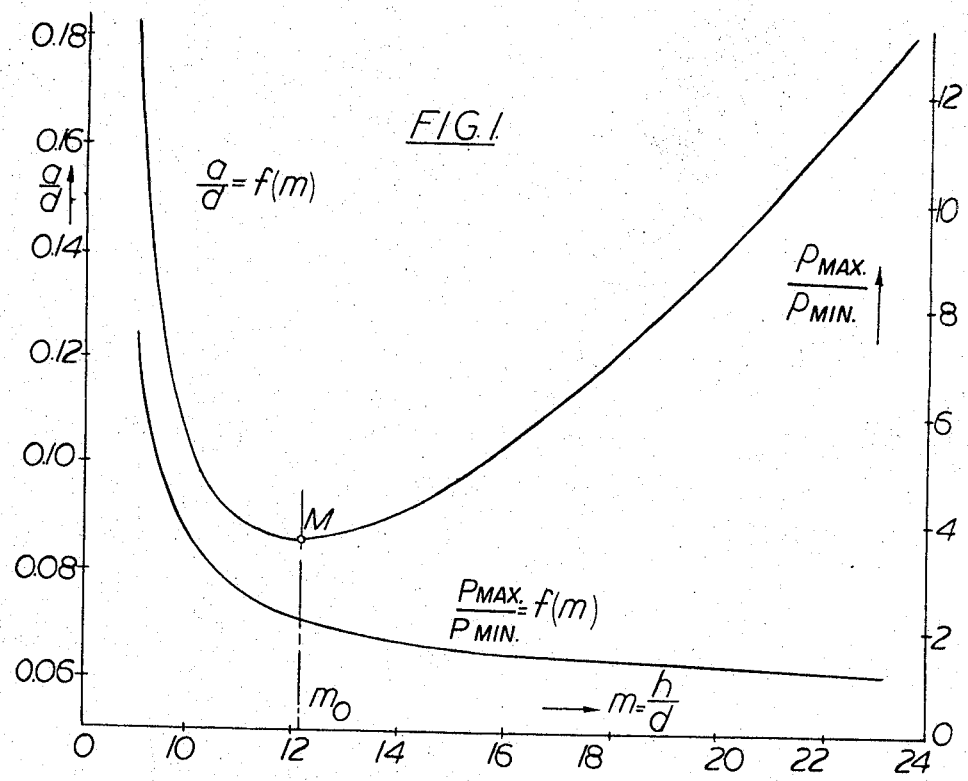

Referring to the drawings, FIG. 1 shows a curve, for a particular cable, of the relation between the relative thickness $a/d$ of the elastic armouring and the relative pitch $m$ of stranding of the armouring ($h/d$) $a$ is the thickness of the armouring and $d$ the internal diameter of the armouring as it lays on the cable. Similarly $h$ is the pitch of the armouring helix. This curve has been drawn for a cable having a minimum internal pressure in the non-current condition of 15 kg./cm.$^2$ and a relative thermal expansion of the dielectric of 0.027. The armouring considered is of hard steel having tensile strength of 70/80 kg./mm.$^2$, an elastic limit $=35$ kg./mm.$^2$ and a modulus of elasticity 20,000 kg./mm.$^2$. Similar curves may be drawn for other armouring materials and other cables.

Any cable being considered for application of the present invention is subjected to two kinds of expansion, one obtained by the initial injection of impregnating fluid, which determines the initial pressure, for example at $-20°$ C. (dependent upon the conditions of the terrain in which the cable is laid) and a thermal expansion due to the heating of the cable by the electric current when in working condition. The presence of these two types of expansion makes it possible to obtain the cycle of the expansion of the cable and its return to initial volume in such a way that the sum of elastic energy offered by the two movements may be a minimum and consequently the total thickness of the armouring may also be a minimum. This minimum of elastic energy or thickness of the armouring corresponds to a predetermined stranding angle $\alpha_{min}$ given by the formula $$\sin \alpha_{min} = \sqrt{\frac{\Delta l/l}{(\Delta v/v)t} f_i}$$

in which $(\Delta v/v)t$ is the relative thermal expansion of the core. For each such value of $\alpha$ there is a value $$m = \frac{h}{d}$$

and the curve of FIG. 1 referred to above shows how the value $a/d$ depends upon $m$. It will be noted that there is minimum M for the value $a/d$ and that this minimum corresponds to a single distinct value of the relative cabling pitch $h/d$.

By means of the curve of FIG. 1 and Equation 2 above the minimum relative thickness $a/d$ of the elastic armouring may be calculated.

It will be noted from FIG. 1 that the curve of $a/d$ as a function of $h/d$ is relatively flat in the neighbourhood of the minimum value of $a/d$ so that it is possible without appreciable loss of efficiency to choose a value of the cabling pitch which does not exactly correspond to the minimum value of $a/d$ in order to use commercial thicknesses of armouring.

FIG. 1 gives also a curve relating the ratio between the maximum $P_{max}$ and minimum $P_{min}$ pressures within the cable and the relative pitch of the armouring $h/d$ necessary to accommodate these ratios of pressure. The pitch of the armouring may therefore be chosen to obtain a desired ratio between these pressures instead of obtaining the minimum relative thickness of the armour.

In the case of very high initial pressure within the cable, the relative thickness of armouring required may be too great for the latter to be applied conveniently in a single layer. The inconveniences occasioned by the use of wires of considerable cross section are mechanical in nature and are well understood.

The inconveniences may be partially overcome, in the case of round wires, by means of a preliminary distortion or by forming the wire into a spiral before applying the armouring.

To obtain the optimum use of the elastic properties of the armouring this may be constituted by several layers each of relative thickness small compared with the total required.

Figure 2:
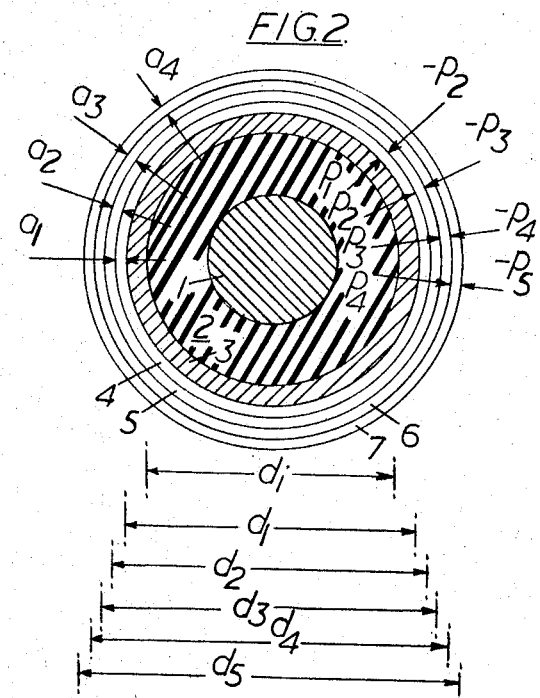
FIG. 2 is a schematic view, partially in cross section, of a cable having several layers of elastic armouring according to the invention.

FIG. 2 is a schematic cross section of a single phase cable with four layers of armouring. The conductor 1, for example, of copper is surrounded by dielectric 2, for example, of impregnated paper having an external diameter $d_1$, and this in turn is surrounded by an impervious sheath 3, for example of lead. The four layers of armouring are denoted by 4, 5, 6 and 7. The internal diameters of the respective layers are $d_1$, $d_2$, $d_3$ and $d_4$ and their respective thicknesses $a_1$, $a_2$, $a_3$ and $a_4$.

The several layers of armouring are subjected, not only to the internal pressure of the cable through any layers below but also to pressure of any layers which may be above them, these pressures acting in opposite directions. The pressures to which the several layers are subjected are shown in FIG. 2 as $p_1$ and $-p_2$, $p_2$ and $-p_3$, $p_3$ and $-p_4$ and $p_4$ and $-p_5$.

In order to ensure that a multilayer elastic amouring can fulfill its function permanently, i.e. for a practical number of heating and cooling cycles, it is essential that the distribution of the load on the armouring between the various layers should be constant and that the tension on any layer should not exceed the elastic limit. It is likewise essential that the radial displacements of all the layers should be equal and that the mutual ratios of the pressures acting between the different layers and the pressure existing below the armouring as well as the external pressure should be substantially constant and independent of the absolute values of such pressures.

To satisfy these requirements the parameters defining the armour must satisfy a mathematical formula, herein called the equation of elastic coordination. To a first approximation this takes the following form:

$$p_1^1 d_1^2 : p_2^1 d_2^2 : p_3^1 d_3^2 : \ldots p_n^1 d_n^2$$
$$= F_1 : F_2 : F_3 : \ldots F_n \quad (3)$$

In this expression $d_1$, $d_2$, $d_3$ . . . $d_n$ are the internal or mean or other conveniently defined diameters of the various layers; $p_1^1$, $p_2^1$, $p_3^1$, . . . $p_n^1$ denote the equivalent pressures acting on the respective layers, which can be defined to a sufficient approximation by the formula:

$$p_k^1 = p_k - \frac{d_{k+1}}{d_k} p_{k+1}$$

where $p_k$ is the pressure acting on the $k$th layer and $d_k$ is the diameter of the $k$th layer. For very thin layers $d_{k+1}/d_k$ is substantially equal to 1 and thus $p_k^1$ equal to $p_k - p_{k+1}$ The factors $F_1$ etc. can be defined sufficiently for practical purposes by $$F_k = E_k^1 a_k f_{2k} \sin^4 \alpha_k \quad (4)$$

wherein $E_k^1$ is the equivalent modulus of elasticity of the layer, $a_k$ is the thickness of the layer, $f_{2k}$ the filling coefficient of the layer that is the ratio between the surface covered by the elements, wires or tapes, of the layer and the total cylindrical surface, whilst $\alpha_k$ is the angle made by the elements of the layer with the cable axis.

There are certain difficulties in achieving elastic coordination between the various layers of the armouring according to the Expressions 3 and 4. First, the stranding angles of the various layers cannot be freely chosen, since they are determined by Equation 2 or by the ratio of extreme pressures. Secondly, the equivalent moduli of elasticity $E_k^1$ are practically speaking physical constants (for very thin layers these moduli are the conventional moduli of the materials of the layers) and consequently depend only on the materials of the layers.

In order to overcome this difficulty, several means may be used. One of these is to introduce intermediate layers of not very resilient materials, for example, textiles or plastics in order to modify the ratio between the thickness of the material of an elastic layer and the internal diameter of this layer.

FIG. 3 shows an example of a cable to which this is applied. A single conductor 81 is in the form of a hollow tube having a central hollow 82 which is filled with a fluid such as a gas or oil under an initial pressure. Surrounding the conductor 81 is a semi-conductor layer 83, and surrounding that a layer 84 of paper impregnated with fluid oil or a viscous compound. Surrounding this again is a mixed layer 85 of semi-conductor tapes and tapes of metallised paper or copper. The whole of this cable core is contained within a lead sheath 86. A protecting layer 87 of textile tapes is applied over the lead sheath. Four layers 88 of elastic armouring are used in the form of flat wires. Two of these layers are separated by an auxiliary layer of textile tapes also denoted 87 and this latter layer is inserted for the purpose above mentioned. A protective layer of textile tapes, also denoted 87 is applied over the outermost elastic armouring layer and a final protective layer 89 of polyvinyl chloride is applied overall.

The function of the intermediate layers between armouring layers is, also, to realise diameters required by the equation of elastic coordination independently of thicknesses of the mechanically active layers, which is particularly important in the case in which all the latter layers are of equal thickness. These intermediate layers also allow of certain tolerances in the design of the elastic armouring, which may be necessary to allow of standard dimensions of the wires or tapes constituting this armouring, and may also be necessary in choosing the pitches of the several layers to be within those determined by the limited number of gears available on classical armouring machines.

An intermediate layer may also be placed, as shown in FIG. 3 between the impervious sheath 86 and the first layer 88 of armouring. This ensures a more uniform distribution of pressures between the layers 88 and also helps to prevent plastic flow of the material of the sheath 86.

In order to satisfy the equation of elastic coordination the filling coefficients may be conveniently chosen.

These are variable with the pitch of cabling and the number and width of the helicoidal elements of the armouring layer.

The function of the final protective layer 89 is to protect the armouring against corrosion, mechanical deterioration and the dislocation of the elements thereof because of bending of the cable. This layer 89 can be of any material fulfilling these functions and can, for example, be of vulcanised rubber.

The number of mechanically active layers according to the invention is only limited by the least thickness of the layers, which can be chosen for reasons of a technological and economic nature. This number may be reduced in certain cases to a single layer.

The thicknesses of multiple layers may be all equal, or all different, or some equal and others different.

The helicoidal elements of an elastic armouring according to the invention may be of any cross-section required to fulfill the conditions. For example there may be used wires of round, half-round, oval, half oval, rectangular, trapezoidal section, tapes of various widths, profiled wires of various forms, e.g., in the form of letter Z, tubes of closed or open section and so on. Tapes bent transversely, tapes provided with a longitudinal groove or grooves, with folded edges, with protuberances at regular distances may each be used with the end of increasing the geometric thickness of the tape without increasing its effective section. Moreover such forms of wires or tapes when used in the outer layer are resistant to deformation due to bending of the cable.

Different forms of elements may be used in the different layers. Thus it is advantageous to use flat wires for the first layer of armouring placed over the impervious sheath in order to ensure a uniform distribution of pressure over the latter.

In order to realise armourings with a cabling pitch as short as possible and thus to render the armouring more resistant to bending of the cable, elements may be used which, owing to their structure possess an effective modulus of elasticity less than that of the material used. For example twisted cords have just such a property, as also do wires formed into a more or less open spiral, or placed helicoidally around a compressible centre of textile, fibrous or synthetic material.

Braided materials may also be used to the same end either in metallic or non-metallic materials. Metallic or non-metallic braids, e.g., in glass silk can be enclosed in a layer of appropriate synthetic resin in order to form a stratified layer and thus improve the mechanical properties of the braid.

The effective modulus of elasticity may also be reduced by using wires or tapes of wave form. The form, depth and pitch of the waves can be chosen as a function of the reduced modulus of elasticity desired, of the elastic limit and of the tension required in the armouring. These waves can be radial to the cable or more or less tangential to its surface.

FIG. 4 shows an example of a part of an armouring layer cut along a generatrix AB and developed into plane form. This layer is formed of wires or ribbons of sinusoidal form placed so that their amplitudes are tangential to the surface of the cable. CD represents a geneatrix diametrically opposite to AB.

Equally elements of an armouring allowing either a greater elasticity or a lesser modulus of elasticity in the transversal direction than in the longitudinal direction to be realised are tubular or hollow bodies of right section either closed or open by a longitudinal interstice.

Armouring elements deformable in an elastic manner in both the transversal and longitudinal directions can have transverse sections before the making up of the armouring different from those after this operation; for example an initially round section can become elliptical after cabling. The essentially elastic deformation to which these elements are subjected during the cabling can be used to place the cable core under initial pressure.

An elastic armouring of one or more layers of elements presenting an important elastic variation in thickness, capable of completely absorbing the increase in volume of the cable core and of any layers beneath it can be surrounded, according to the invention by a substantially inextensible external layer equivalent to a rigid collar.

The elastic armouring according to the present invention can be applied to cables with one or more conductors of round, oval, triangular or polygonal transverse section with apices more or less rounded according to the conductor section.

In the case of a single phase conductor cable with an oval impervious sheath, a part of the increase in volume of the cable core due to the initial pressure and to the thermal expansion is produced without any elongation of the perimeter of the said sheath, thanks to the decrease in the eccentricity of the oval. Only another part of the increase in volume of the cable core which cannot be absorbed by the change of the shape of the sheath is taken up by the elongation of the latter and of the helicoidal elements of the armouring, which allows this latter to be carried out with a reduced cabling pitch.

Such an oval cable can be furnished with an elastic armouring of either equally oval section or of circular section. An elastic armouring of circular section allows, according to the invention of better use of its mechanical properties.

In order to place a circular elastic armouring over a cable having an oval impervious sheath, the latter must be provided with a packing or a sheath of an appropriate form to make its transverse section substantially circular. Several means to effect this operation may be used according to the present invention. First, there may be placed, for example by extrusion over an impervious sheath of lead or a convenient metal alloy a second sheath of round external form in plastic material or in rubber loaded with mineral or other products to decrease the coefficient of thermal expansion of the sheath. Along the smaller axis of the oval there may be placed bands of a convenient form fixed to the cable by taping, by gluing or in any suitable manner. These longitudinal bands may be of any appropriate material such as a thermoplastic or rubber. They can also be formed of any metal whatever and provided with transverse cuts to increase their flexibility. They may be flattened tapes of variable thickness in the transverse direction.

FIG. 5 shows the cross section of a cable having an oval lead sheath and circular armouring. The conductor 11 is of oval cross section surrounded by a semi-conductor layer 12, which in turn is surrounded by insulation 13 of paper impregnated with cable compound. Around this is a layer 14 of semi-conductor tapes and metallised paper or copper tapes. Over this again is an oval lead sheath 15 placed with a gap between it and the underlying layer 14 to allow of the cable being placed under an initial pressure. Over the lead sheath is an extruded sheath 16, e.g. in polyvinyl chloride. 17 is a layer of textile tapes, 18 a layer of flattened wires of the elastic armouring, whilst 19 is another layer of elastic armouring of round wires which have been pre-distorted and preformed into a helix before application in order to avoid torsion of the cable. 20 is a layer of textile tapes and 21 a protective sheath of polyvinyl chloride.

Elastic armouring for multi-conductor cables having a polygonal section with rounded corners can follow more or less faithfully the polygonal form of the impervious sheath or be circular. In order to place a circular armouring on a polygonal sheath, the latter should be surrounded by a packing applied in the same manner as mentioned above for an oval sheath. An impervious sheath in thermoplastic material can be extruded around a polygonal cable core to give it a round exterior thus allowing of the immediate application of a circular armouring.

FIG. 6 shows an example of a cable with three conductors twisted together and placed within a polygonal lead sheath. The cable is shown in cross section. There are three copper conductors 31 each surrounded by a semiconductor layer 32 and each separately provided with insulation 33 of impregnated paper. Each single core as well as the group of cores is surronded by a layer 34 or 36 of mixed semi-conductor tapes and metallised paper or copper tapes.

Open metal spirals 35 are provided for impregnation purposes and located between the single cores. The three cores are placed together in triangular form and surrounded by a triangular lead sheath 37. Over this is applied by extrusion a sheath 38 having a circular exterior perimeter. 39 is a layer of textile tapes, 40 and 41 two layers of flattened steel wires forming the elastic armouring, 42 a layer of textile tapes, 43 and 44 two layers of the elastic armouring of flattened steel wires, 45 a temporary protective layer of textile tapes and 46 the external protective sheath of polyvinyl chlorides.

The present invention is applicable to high tension cables having plastic insulation applied by extrusion which are given a desired initial internal pressure by means of a gas filling the interior of the cable or by means of an initial mechanical tension of the armouring.

Cables impregnated with fluid oil, or with a viscous cable compound may be placed under an initial pressure by supplying the impregnating fluid through suitable channels within the cable core.

As is known, the pressure exerted by an armouring on the cable core is directly proportional to the longitudinal tensions of the helicoidal elements of the armouring and inversely proportional to the value of their radii of curvature in a normal plane. If it can be admitted that the longitudinal tensions remain constant after bending of the cable, this is not in general true for the radii of curvature.

Taking as a first approximation that after bending the cable section keeps substantially a circular form, the radii of curvature of the helicoidal elements of the armouring become greater at the surface of the cable situated in the inside of the arc that it forms after this operation and smaller at the outside of this arc, and this provokes changes in the pressures exerted by the armouring that are not negligible.

These inconveniences may be remedied by judiciously calculated shortening of the pitch or pitches of the armouring calculated according to the formulae given above or analogous formulae.

Instead of adapting the pitch of the elastic armouring to the bending conditions, this pitch may be determined for a straight cable and the armouring be locally reinforced on the curvilinear portions. This reinforcement may be elastic, rigid and semi-rigid according to the materials used to that end and their method of application, e.g. with a certain play between the armouring to be reinforced and the reinforcement.

The local reinforcement of the elastic armouring can be applied in a continuous form, e.g., of windings of wires or tapes in appropriate metallic or non-metallic materials, preformed spirals, tubes, solid or composed of two half bushings of metal or plastic material or other adequate means. Continuous reinforcement can also be realised by immersion in more or less thin concrete, in natural or synthetic resin, e.g. thermosetting or in any insulating mass of a sufficiently high melting temperature.

Local reinforcement of a discontinuous nature can be obtained by means of clamps, collars or attachments for fixing the cable and other analogous means placed at judiciously disposed distances.

The thermal expansion of the oil or other impregnating compound in the section of cable held by a rigid or semi-rigid reinforcement which theoretically does not allow of increase of volume of the cable at that place, can be absorbed in neighbouring straight sections to either side of the reinforced section. In the case of a cable with high internal pressure or with a blocked section relatively long, it is useful to provide on each side of the latter along a judiciously chosen length, a protection for the purpose of limiting the expansion of the cable at this place to an admissible extent and to force it to be spread over a desired distance greater than that of the rigidly or semi-rigidly reinforced curvilinear section, thus avoiding any inadmissible expansion of the armouring in the immediate neighbourhood of the last mentioned section.

This protection can be obtained by means analogous to those used for the reinforcements above mentioned but applied, e.g. with a certain play allowing a partial expansion of the armouring.

Accessories for cables provided with elastic armouring according to the invention are fitted to satisfy usual security conditions and to conditions of particular operation for the said elastic armouring.

What I claim is:

1. Electric power cable comprising at least one conductor, a dielectric under a pressure greater than atmospheric when no current is passing, an impermeable sheath and an elastic metallic armouring of high mechanical resistance and high resilience laid helicoidally over said sheath and having a relative thickness $a/d$ where $a$ is the thickness of the armouring and $d$ the diameter over which the armouring is laid at the minimum when said relative thicknesses are plotted as ordinates against the relative pitches $h/d$ of said armouring as abcissae for the said cable, where $h$ is the pitch of said armouring and $d$ the diameter over which the armouring is laid.

2. Electric power cable comprising at least one conductor, a dielectric containing a fluid under a preliminary pressure greater than atmospheric when no current is passing, an impermeable sheath and a metallic armouring of high mechanical resistance and high resilience constituted by at least two layers each laid helicoidally to maintain pressure on said dielectric and of such lay lengths, thicknesses and other parameters defining each layer that the inner layer does not hinder the upper layer from exerting its full pressure on said dielectric and that the total pressure exerted is equal to the sum of the pressures exerted by all layers of the armouring and at least one layer of material of low resilience placed between two layers of armouring and of such thickness as to cause the parameters of said layers of armouring to satisfy the equation of elastic coordination as defined in the specification wherein the factors $F_k = E_k^1 a_k f_{2k} \sin^4 \alpha k$ with $E_k^1$ the equivalent modulus of elasticity of the latter layer, $a_k$ is the thickness of the layer, $f_{2k}$ is the ratio between the surface covered by the armouring to the total cylindrical surface and $\alpha k$ is the angle made by the latter layer with the cable axis.

References Cited by the Examiner

UNITED STATES PATENTS

| | | | |
|---|---|---|---|
| 1,791,043 | 2/1931 | Schrottke | 174—106 |
| 1,906,968 | 5/1933 | Hunter et al. | 174—25 X |
| 1,948,439 | 2/1934 | Budscheid | 174—106 |
| 2,240,745 | 5/1941 | Atkinson | 174—26 X |
| 2,754,351 | 7/1956 | Horn | 174—105 |

LEWIS H. MYERS, *Primary Examiner.*

JOHN F. BURNS, *Examiner.*

D. A. KETTLESTRINGS, H. HUBERFELD,
*Assistant Examiners.*